Figure 1:
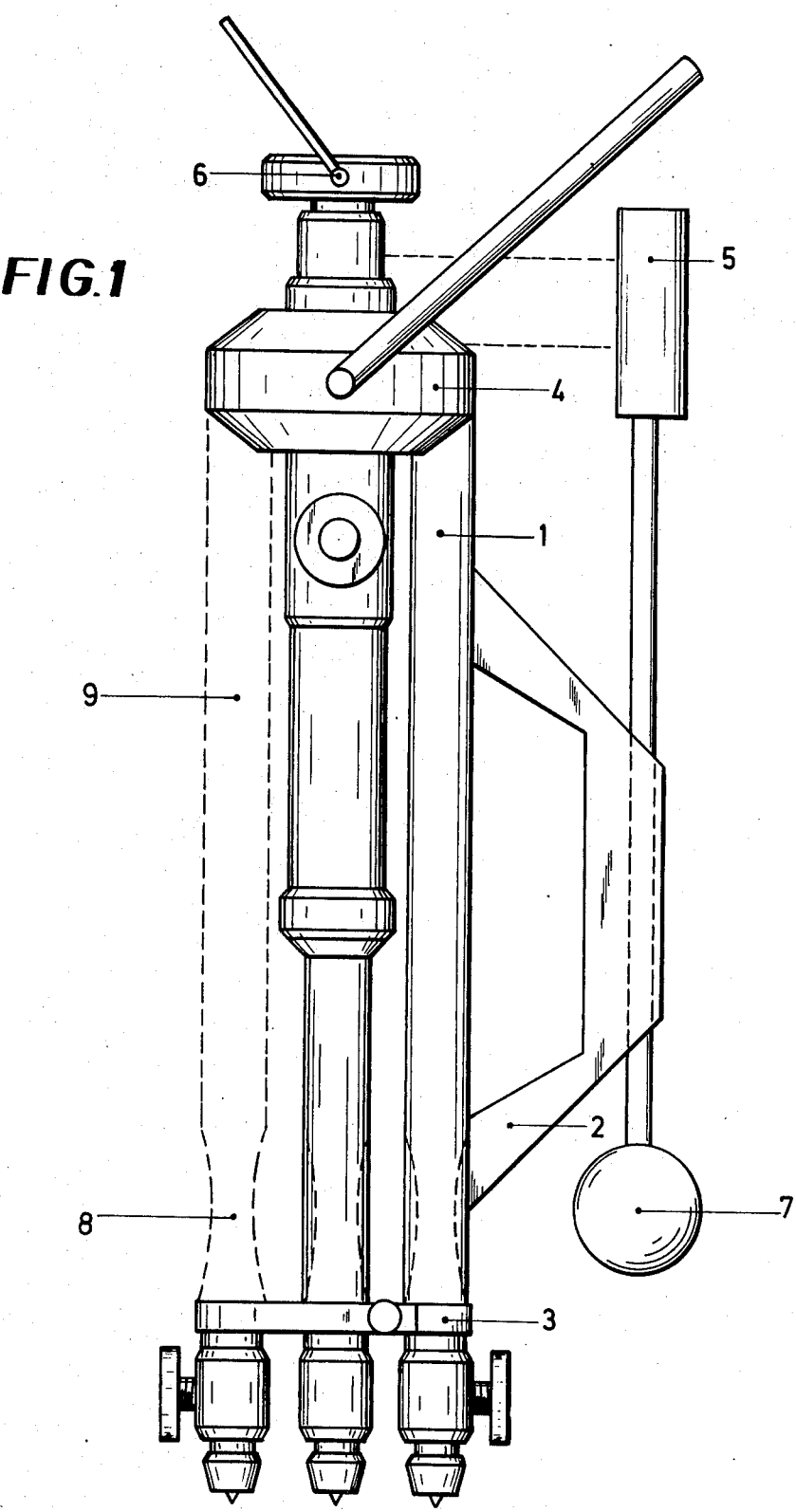

United States Patent
Niggeloh

[15] 3,705,703
[45] Dec. 12, 1972

[54] STAND WITH CARRYING DEVICE
[72] Inventor: Curt Niggeloh, Fichtenhof, 5608 Radevorwald, Germany
[22] Filed: April 27, 1970
[21] Appl. No.: 32,132

[30]    Foreign Application Priority Data

April 28, 1969   Germany ..................... G 69 17 159
Nov. 28, 1969   Germany .................... G 69 46 137.6

[52] U.S. Cl. ...................... 248/168, 95/86, 248/177, 248/188.5
[51] Int. Cl. ...................... F16m 11/06, F16m 11/38
[58] Field of Search...248/168, 435, 434, 166, 188.5, 248/177-181; 95/86; 264/328; 138/174, 145, 146

[56]              References Cited

UNITED STATES PATENTS 2,744,712   5/1956   Brandt ......................... 238/188.5 X
3,200,023   8/1965   Calker ............................. 264/328 X
2,646,822   7/1953   Ferguson ......................... 138/145 X
2,973,933   3/1961   Howell ............................ 248/168 X
3,128,982   4/1964   Christopher ....................... 95/86 X
2,352,794   7/1944   Love ................................ 248/168
2,703,691   3/1955   Minnis ......................... 248/188.5 X
2,877,501   3/1959   Bradt ............................. 264/328 X

*Primary Examiner*—Ramon S. Britts
*Attorney*—Ernest G. Montague

[57]              ABSTRACT

A stand, particularly for photo- or film-cameras, which comprises at least one leg including profiled tubes, telescope-like displaceable into each other and capable of being clamped together relative to each other. A stand-head is pivotally connected with the tubes, and one of a carrying grip and of a carrying loom disposed on the leg and comprises the same working material as that of the stand leg.

11 Claims, 2 Drawing Figures

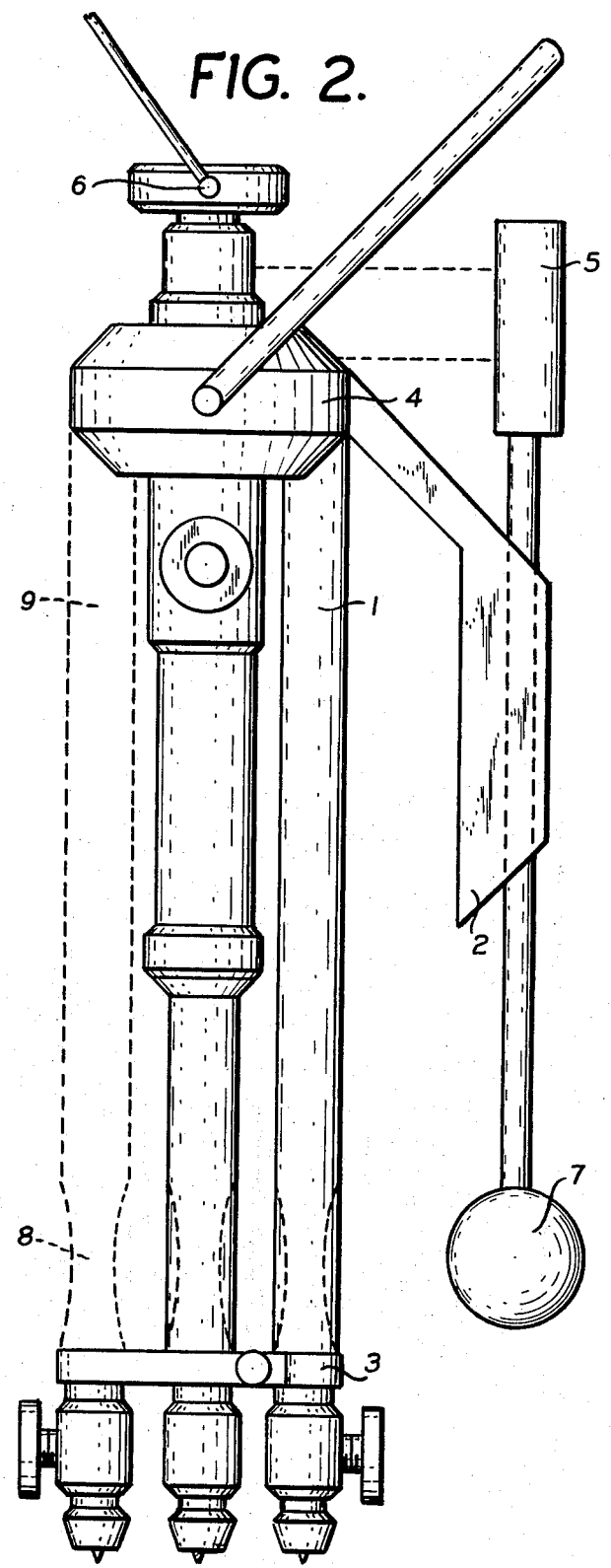

STAND WITH CARRYING DEVICE

The present invention relates to a stand, particularly for photo- or film-cameras, comprising at least one leg member which includes round or profiled tubes, which are telescope-like displaceable into each other and capable of being clamped relative to each other, which tubes are pivotally connected to a stand-head.

The stand often equipped with sensitive surfaces is normally carried or transported in a bag or in a pocket. For the purpose of use, the stand is removed, and it is found that the bag or the pocket is hindering and there is tendency to eliminate the same.

A stand must be carried in addition, for example, during interruption of taking pictures or by example during the transportation on short trips. It is difficult thereby to carry or to handle the often unhandy stand with the camera screwed-on to the plate to carry the stand in addition to the camera.

For photocameras so-called walking stick-stands are known already, which have a grip at the stand-head which is designed, by example, in form of a walking cane-grip. Such design would not be possible, however, in connection with the appreciably heavier stands for filmcameras. It is one object of the present invention to provide a stand with a carrying device, which simplifies particularly the carrying of stands and stands with cameras.

With this and other objects in view, which will become apparent in the following detailed description, the present invention will be clearly understood in connection with the accompanying drawings in which FIG. 1 is an elevation of a stand designed in accordance with the present invention.

FIG. 2 illustrates a second embodiment of the invention.

Referring now to the drawings, the embodiment shown in FIG. 1 comprises one or a plurality of stand legs 1 to which a carrying grip 2 or a carrying loop, consisting of the same material as that of the legs, is arranged. The second embodiment resides in an arrangement according to which a carrying grip or a carrying loop is provided on the head 5 or preferably on the pivoting plate 6. In this embodiment, the lever 7 provided for the swinging of the cameras is received in the carrying grip 2 and is secured by means of a screw- or clamp-connection. In accordance with a special embodiment of the present invention the stand legs cam comprise shock-proof and tough tubes of synthetic material, preferably polyamide tubes, which can be fortified with glass fibers under circumstances. For a better handling, gripping cavities 8 are provided on the tubes. The carrying grip 2 which can be made of synthetic material can be connected in the embodiment of the stand legs of synthetic material by injection moulding with one of the upper tubes of synthetic material pivotally connected directly to the stand-head 4. For the improvement of the connection stability, the round or profiled tubes, the latter particularly in their closed state comprise synthetic material consisting of two parts 9. The tubes of the stand legs 1 and the carrying grip 2 are formed preferably of black or anthracide-colored synthetic material. Under certain circumstances, the stand legs 1 can be made also of light metal tubes covered with synthetic material.

Finally the legs of the collapsed stand are held together during their carrying with a band 3 of rubber or flexible synthetic material.

While I have disclosed several embodiments of the present invention, it is to be understood that these embodiment are given by example only and not in a limiting sense.

I claim:

1. A stand, particularly for photo- or film-cameras, comprising
    at least one leg including profiled tubes telescope-like displaceable into each other and capable of being clamped together relative to each other,
    a stand-head pivotally connected with said tubes, and
    a carrying loop formed integral with said leg and comprising the same working material as that of said stand leg to define a one-piece unit therewith.

2. A stand, particularly for photo- or film-cameras, comprising
    at least one leg including profiled tubes telescope-like displaceable into each other and capable of being clamped together relative to each other,
    a stand-head pivotally connected with said tubes, and
    a carrying loop formed integral with said stand-head and comprising the same working material as said stand-head to define a one-piece unit therewith.

3. The stand, as set forth in claim 2, which includes
    a lever received in said carrying loop and adapted for swinging of the cameras, and
    said lever is secured by one of a screw- and clamping connection.

4. The stand, as set forth in claim 1, wherein
    said stand legs comprise shock-proof and tough tubes of synthetic material 5. The stand, as set forth in claim 4, wherein
    said synthetic material comprises tubes of polyamide.

6. The stand, as set forth in claim 4, wherein
    said tubes comprise synthetic material fortified by glass fibers.

7. The stand, as set forth in claim 1, wherein
    said tubes include gripping cavities.

8. The stand, as set forth in claim 1, wherein said carrying loop consisting of synthetic material is integrally connected in one piece with one of the upper tubes pivotally connected directly to said stand-head.

9. The stand, as set forth in claim 1, wherein
    said profiled tubes, in their closed state, of synthetic material comprise two parts.

10. The stand, as set forth in claim 1, wherein
    said tubes of said stand legs and said carrying loop comprise black or anthracide colored synthetic material.

11. The stand, as set forth in claim 1, wherein
    said stand legs comprise light metal tubes covered with synthetic material.

* * * * *